May 18, 1954 J. W. OEHRLI 2,678,566
POWER TRANSMISSION APPARATUS
Filed Jan. 7, 1950 5 Sheets-Sheet 3

INVENTOR.
JOHN W. OEHRLI
BY

Patented May 18, 1954

2,678,566

UNITED STATES PATENT OFFICE 2,678,566

POWER TRANSMISSION APPARATUS

John W. Oehrli, Culver City, Calif.

Application January 7, 1950, Serial No. 137,330

12 Claims. (Cl. 74—230.17)

This invention relates to power transmission apparatus and has particular reference to a variable ratio torque responsive transmission which finds particular utility when used in motor vehicle to transmit power from the motor to the driving wheels.

In the design and construction of motor vehicles such as automobiles, trucks, motor scooters, and the like, it is necessary to interpose between the motor or engine and the driving wheels a power transmission apparatus of adjustable ratio in order to meet the widely varying load and speed requirements. This is due to the fact that the internal combustion engine is essentially a constant speed device which operates efficiently and develops full power only over a relatively narrow speed range. In the operation of such vehicles, it is desirable under many conditions to operate the engine at the speed which provides maximum efficiency or maximum power output, and these conditions may correspond to any of a large number of vehicle speeds, or may involve a continuous variation over a wide speed range.

For example, maximum power output is desirable when accelerating a heavy load or rapidly accelerating a lightly loaded vehicle. Similarly, and particularly with commercial vehicles, it is desirable to operate at maximum efficiency on long trips which may involve numerous changes of grade. In both instances it is desirable to operate the engine at the optimum speed while the speed of the vehicle is continually changing, and this can be accomplished only by changing the drive ratio.

Conventional manual transmissions do not provide the desired results, because the engine must be operated through a wide range of speeds for each gear ratio selected. Increasing the number of ratios available reduces the width of the range of engine speeds required, but requires an undue amount of attention and effort on the part of the operator.

In an endeavor to overcome the shortcomings of the conventional transmission, a number of types of automatic transmissions have been developed which fall roughly into two classes, i. e., automatically shifting multiple ratio transmissions, and torque convertors. The former merely comprise automatic controls for shifting a conventional transmission, and therefore embody the disadvantages of requiring the engine to be operated over a wide range of speeds. The torque convertors meet the continuously variable ratio and torque responsive requirements, but are large, heavy and expensive to manufacture and maintain. Furthermore, the fluid turbine types of torque convertors are somewhat inefficient which is undesirable and present a further problem in dissipating the heat generated by the power lost in the transmission. None of the former automatic transmissions are in any way suitable for use on inexpensive light-weight vehicles such as motor scooters, motor tricycles, small motor cars, and the like, because of their size, weight and cost.

It is therefore an object of this invention to provide a power transmission apparatus which meets the above-mentioned desiderata, and overcomes the aforestated disadvantages by including a speed and torque responsive mechanism providing a continuously variable drive ratio while being of simple and inexpensive construction.

It is also an object of this invention to provide a power transmission apparatus of the character set forth in the preceding paragraph in which the power is transmitted by friction means operating on variable effective radii.

It is an additional object of this invention to provide a transmission apparatus of the character hereinbefore mentioned in which the power is transmitted by a belt encircling pulleys of oppositely variable radii.

It is an additional object of this invention to provide a transmission apparatus of the character described in the preceding paragraphs which includes speed and torque-responsive means for varying said radii.

It is also an object of this invention to provide a transmission apparatus of the character set forth hereinbefore in which a speed responsive means associated with the input or driving shaft coacts with a torque-responsive means associated with the output or driven shaft to determine the drive ratio between said shafts.

It is a still further object of this invention to provide a power transmission apparatus of the character hereinbefore described which includes a clutch mechanism for disconnecting the driving and driven shafts when the speed of the driving shaft is less than a predetermined value.

It is also an object of this invention to provide a power transmission apparatus of the character set forth in the preceding paragraphs in which said torque-responsive means is also sense responsive to provide a different speed-torque-ratio relation when decelerating than obtains upon acceleration.

Other objects and advantages of this invention will be apparent from a consideration of the following specification read in connection with the accompanying drawings wherein.

Figure 1:
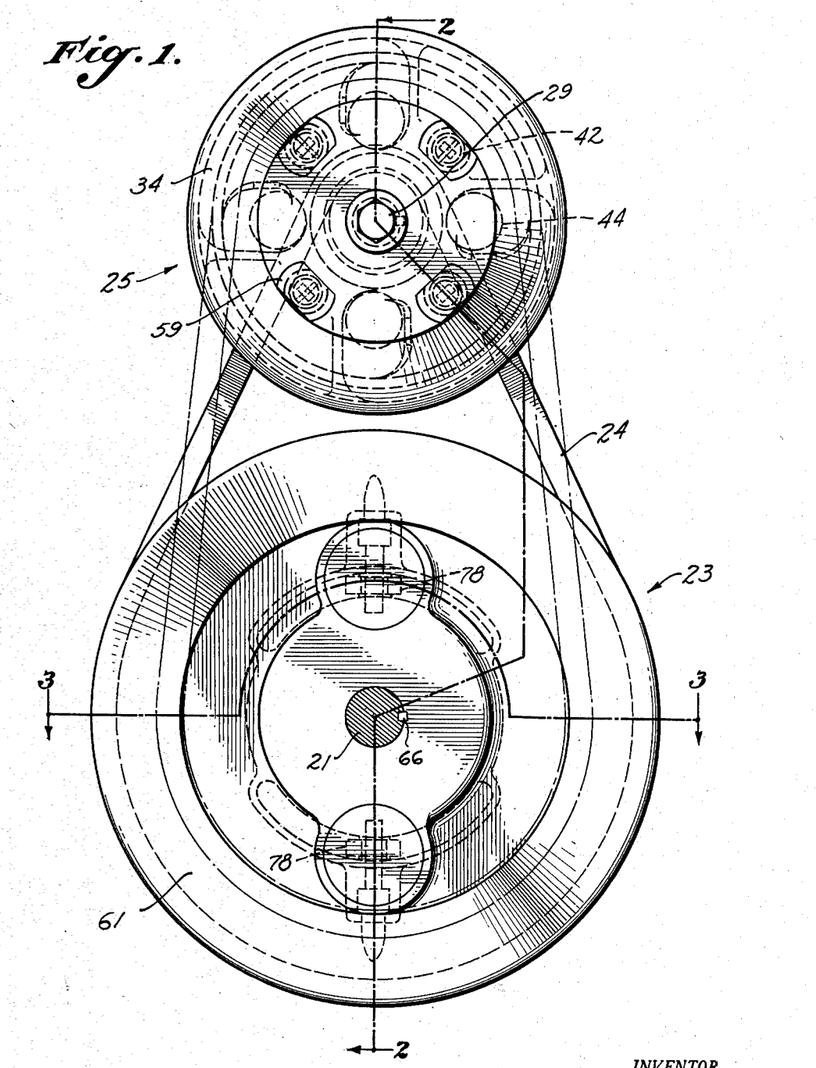
Figure 1 is an elevational view illustrating one preferred form of power transmission apparatus constructed in accordance with this invention.
Figures 2, 3, 4:
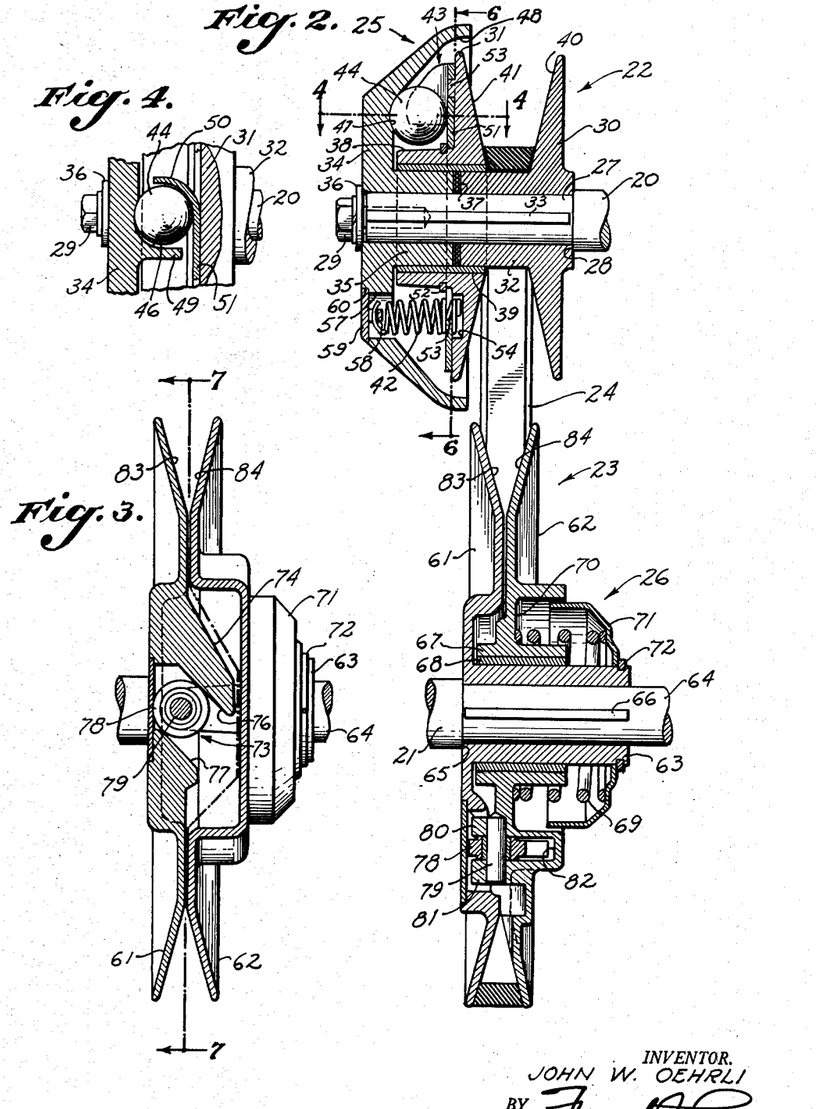
Figure 2 is a vertical sectional view taken substantially along the line 2—2 of Figure 1 and illustrating the construction of the driving and driven members of the transmission apparatus.
Figure 3 is a vertical sectional view taken substantially along the line 3—3 of Figure 1 and illustrating additional details of construction of the driven member.
Figure 4 is a fragmentary sectional view taken substantially along the line 4—4 of Figure 2 illustrating the driving connection afforded by the speed responsive element of the driving member.

In the drawings and particularly in Figures 1 and 2 thereof, the power transmission apparatus of this invention is shown as drivably interconnecting a driving shaft 20 with a driven shaft 21. As applied to a motor vehicle, the driving shaft 20 may be coupled to or constitute an extension of the crank shaft of the internal combustion engine, while the driven shaft 21 may be coupled to or form an extension of the drive shaft or jack shaft for transmitting power to the driving wheels of the vehicle. It will be realized, however, that the reference herein to the use of the power transmission apparatus in motor vehicles is by way of illustration only and not by way of limitation, since the device is well adapted for drivably interconnecting the driving and driven shafts of many other types of mechanisms.

Briefly described, the transmission apparatus of this invention comprises a driving pulley indicated generally by the reference character 22 secured to the driving shaft 20 and a driven pulley indicated generally by the reference character 23 secured to the driven shaft 21. The driving pulley 22 and the driven pulley 23 are encircled by a belt 24. Associated with the driving pulley 22 is a speed-responsive control mechanism indicated generally by the reference character 25, and a torque-responsive mechanism indicated generally by the reference character 26 is operatively associated with the driven pulley 23. The pulleys 22 and 23 are both of the variable diameter type and the speed and torque responsive mechanisms 25 and 26 coact during the operation of the device (as will be made more apparent hereinafter) to vary the diameters of the pulleys 22 and 23 in opposite directions and as a function of the speed and load conditions. The changes in pulley diameters effected by the control mechanisms are of equal amount and in opposite directions so that the belt 24 is maintained taut at all times when it is required to transmit power from the driving shaft 20 to the driven shaft 21. The pulleys 22, 23 and the belt 24 thus constitute one form of friction drive in which the friction drive members are arranged to operate on variable effective radii.

In the forms of the invention to be specifically described, the belt 24 has been shown as a V-belt of conventional construction, and to cooperate therewith the pulleys 23 and 24 are disclosed as being of the V-belt type. While a V-belt drive is preferred because it is peculiarly adapted to use with variable diameter pulleys and because of its superior power handling capabilities, the invention nevertheless contemplates the use of other forms of friction drive means of variable radii including belts and pulleys of other types. For example, in lieu of a flexible V-belt, a rigid steel ring of appropriate cross section may be used. Such a ring would frictionally engage the upper portion of the upper pulley and the lower portion of the lower pulley.

The driving shaft 20 is provided on its outer end with a reduced diameter portion 27 defining a shoulder 28 against which the pulley assembly 22 is held by means of a clamping screw 29 threadedly secured to the outer end of the shaft portion 27. The pulley 22 is formed as two relatively movable halves 30 and 31, the pulley half 30 including a central hub 32 which is bored to receive the shaft 27 and which is non-rotatably secured thereto as by means of a key 33 engaging suitably keyways formed in the shaft 27 and in the hub 32. The speed-responsive control mechanism 25 includes a housing member 34 which has a central hub 35 of the same diameter as the hub 32 previously mentioned. The hub 35 is bored to receive the shaft 27 and is non-rotatably secured to the shaft by means of the aforementioned key 33 which also engages a suitable keyway formed in the hub 35. The clamping screw 29, through the medium of a washer 36, bears against the outer face of the housing 34 and serves to clamp housing 34 and pulley half 30 between the washer 36 and the shoulder 28. If desired, for relative axial adjustment of the members 30 and 34, spacing members 37 may be interposed between the opposed faces of the hubs 32 and 35, the spacing members 37 preferably comprising washer-like elements encircling the shaft 27.

The pulley half 31 also includes a hub 38 which is bored and fitted with a sleeve 39 which encircles the hubs 32 and 35 and serves to mount the pulley half 31 for free axial sliding movement toward and away from the pulley half 30.

Figures 5, 6, 7:
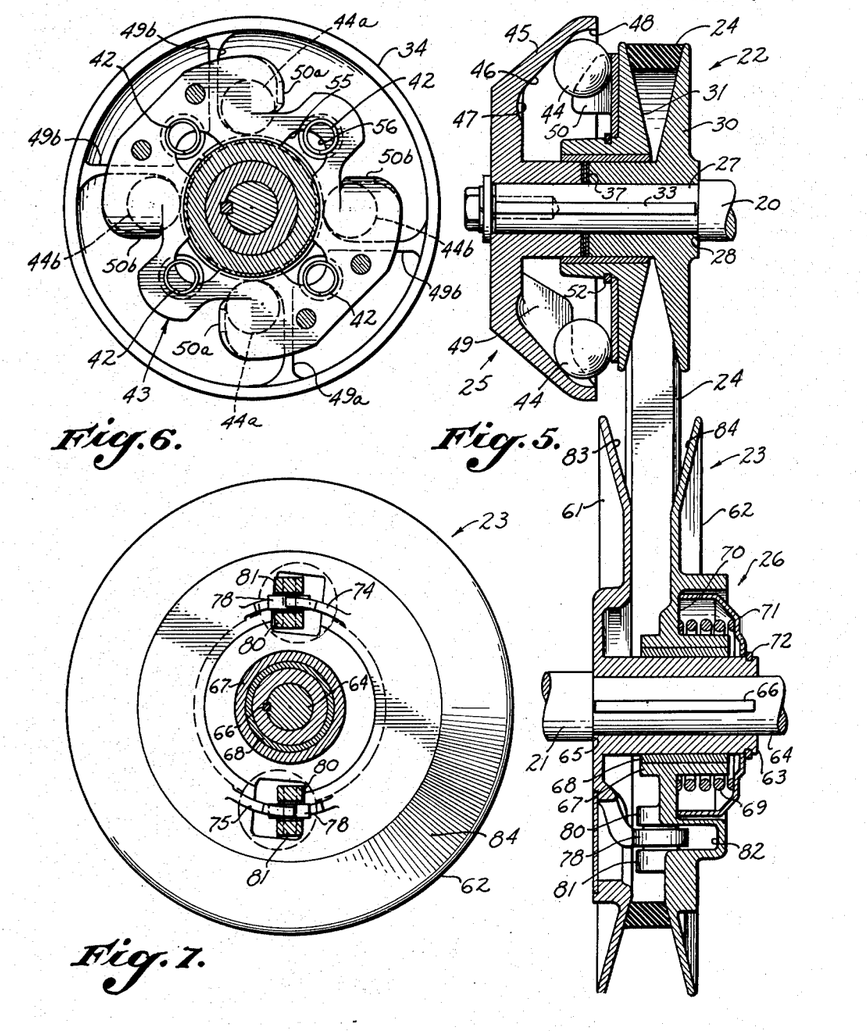
Figure 5 is a sectional view similar to Figure 2 but illustrating the relative positions of the movable parts when the driving ratio is changed from that represented by the positions of the parts in Figure 2.
Figure 6 is a sectional view taken through the driving member in the direction indicated by the line 6—6 of Figure 2.
Figure 7 is a sectional view taken substantially along the line 7—7 of Figure 3 and illustrating additional details of construction of the driven member.

The pulley halves 30 and 31 are provided with inwardly facing belt-engaging surfaces 40 and 41 which are inclined at such an angle as to conform to the angularity of the slides of the V-belt 24. The parts are so proportioned as to allow the pulley half 31 to be moved between the two positions which are illustrated in Figures 2 and 5. In the position shown in Figure 2, the pulley half 31 occupies its outermost position in which the belt engaging faces 40 and 41 are separated a distance exceeding the width of the belt 24 so as to provide no driving engagement of the pulley with the belt. In this position the driving shaft 20 may be slowly rotated without transmitting any power through the belt 24 to the driven pulley 23.

In the other extreme position (Figure 5), the pulley half 31 occupies its innermost position in close proximity to the pulley half 30. In this position, the belt 24 rides the extreme diameter of the pulley by virtue of the fact that the belt engaging faces 40 and 41 are too close together at lesser radii to accommodate the width of the belt 24.

Thus, movement of the pulley half 31 between the two positions illustrated respectively in Figures 2 and 5 changes the cooperative relation between the pulley and the belt from an initial position in which no driving engagement between the belt and pulley obtains through engagement at increasingly larger effective pulley diameters until the maximum diameter condition shown in Figure 5 is attained. This movement of the pulley half 31 relative to the pulley half 30 is effected by means of the speed responsive means 25, which cooperates with tension springs 42 extending between and secured to the housing 34 and the pulley half 31 and serving normally to move the pulley half 31 to its initial or disengaged position as shown in Figure 2.

The speed control mechanism 25 comprises principally the aforementioned housing 34, a driving and thrust plate assembly 43, and a plurality of rolling members such as steel balls 44 interposed between the inner surface of the housing 34 and the thrust plate assembly 43.

The housing 34 includes an outer portion 45 of generally conical form defining on its inner surface a plurality of raceways 46 along which the balls 44 may move. The raceways 46 lie in axial planes including the axis of rotation of the driving shaft 20, and are inclined to that axis so that as the balls 44 move from the inner ends 47 of the raceways 46 to the outer ends 48 thereof, they move outwardly relative to the shaft 20 and at the same time move laterally toward the fixed pulley half 30. The balls, being confined between the raceway 46 and the thrust plate 43, serve to move the pulley half 31 between the two extreme positions shown respectively in Figures 2 and 5 as the balls 44 move along their raceways 46 under the influence of the centrifugal force exerted on the balls by their rotation with the pulley assembly 22 as the driving shaft 20 is rotated.

The balls 44 serve also to provide a driving engagement of the pulley half 31 with the housing 34 which is keyed to rotate with the driving shaft 20. To this end, the inner surface of the housing 34 is provided with wall means in the form of ribs 49 which parallel the raceways 46 and which are disposed to engage the sides of the balls 44 as is shown in Figure 4 so as to cause the balls 44 to rotate with the housing 34. The opposite side of each of the balls 44 is engaged by wall means in the form of an upstanding ear 50 which may be sheared and bent outwardly from the plane of the thrust plate 43 as is best shown in Figures 2, 4, and 6. The thrust plate 43 is provided with a central bore permitting it to be passed over the hub 38 and into engagement with the outer face 51 of the pulley half 31. The plate 43 is held in this position by means of a snap ring 52 received in a suitably formed annular groove in the hub 38 and is held against rotation relative to the pulley half 31 by means of a plurality of axially extending bosses 53 formed integrally with the pulley half 31 and received within suitably positioned apertures formed in the thrust plate 43.

In order that the balls 44 will drivably interengage the housing 34 with the pulley half 31 for either direction of rotation of the driving shaft 20, the balls 44 are preferably arranged in pairs, two such pairs of balls being identified in Figure 6 by the reference characters 44a and 44b. The reference characters 49a and 49b are used to identify those of the ribs 49 which are associated respectively with the balls 44a and 44b. It will be seen from Figure 6 that the balls 44a lie on the clockwise side of their associated ribs 49a whereas the balls 44b are situated on the counterclockwise side of their associated ribs 49b. Thus, as viewed in Figure 6, clockwise rotation of the housing 34 drives the pulley half 31 through the ribs 49a, balls 44a, and ears 50a, whereas in the opposite direction torque is transmitted to the pulley half 31 through the ribs 49b, balls 44b, and ears 50b. This arrangement simplifies the construction by obviating the need for a splined connection between the hubs 38 and 32, 35.

The thrust plate 43, in addition to functioning as a thrust plate and providing driving engagements with the balls 44 as described, also functions as an anchor for the inner ends of the tension springs 42. As is shown in Figure 6, a plurality of the springs 42 is employed spaced uniformly about the axis of rotation of the housing 34. At these locations the outer face 51 of the pulley half 31 is recessed as shown at 54 to receive the inner ends of the springs 42, and at these locations the thrust plate 43 is cut away as shown at 55 to partially uncover the recesses 54. A part of each of the recesses 54 is covered by a portion 56 of the thrust plate 43 which extends across the recess 54 and extends between adjacent turns of the spring 42 near the inner end thereof to prevent the spring 42 from being moved axially out of the recess 54, the springs being so attached to the thrust plate 43 through the cutout portions 55 before the thrust plate 43 is secured to the pulley half 31.

The outer ends of the springs 42 are received in suitable axially extending bores 57 provided at the appropriate locations in the housing 34 and are engaged by a hook member 58 formed on the inner face of a spring retainer 59. The spring retainer 59 is seated within a counterbore 60 formed in the outer end of the bore 57.

With the structure thus far described, it will be seen that when the shaft 20 is stationary or rotating slowly the pulley half 31 occupies its extreme lefthand position and so disconnects the driving shaft 20 from the belt 24. As the speed of the shaft 20 is increased the balls 44 move outwardly along their raceways 46 and gradually move the pulley half 31 toward the pulley half 30. This results first in an engagement of the belt 24 by the two pulley halves 30 and 31 so as to begin the transmission of power through the belt 24 at the minimum diameter of the pulley 22. As the balls 44 move further outwardly along their raceways, the pulley half 31 is moved further inward so as to gradually increase the effective operating diameter of the pulley 22 until, at a predetermined relative high speed, the pulley 22 occupies its maximum diameter condition as shown in Figure 5.

The driven pulley 23 is formed as two relatively movable halves comprising a fixed pulley half 61 and a movable pulley half 62. The fixed pulley half 61 includes a central hub 63 which is bored to receive a reduced diameter portion 64 of the driven shaft 21, defining a radial shoulder 65 against which the hub 63 bears. The hub 63 is non-rotatably secured to the shaft extension 64 by means of a key 66 engaging suitable keyways formed in the hub 63 and in the shaft extension 64. The movable pulley half 62 is provided with a central hub 67 which is bored and sleeved as at 68 to be slidably received on the hub 63 to permit the pulley half 62 to be moved between the two extreme positions shown respectively in Figures 2 and 5. In Figures 2, the pulley half 62 is shown as occupying its innermost position providing a maximum effective pulley diameter, whereas in Figure 5 the pulley half 62 is shown in its outermost position providing a minimum effective pulley diameter.

The pulley half 62 is normally urged inwardly toward the position shown in Figure 2 by a compression spring 69 confined between a radial web portion 70 of the pulley half 62 and a cup-like spring retainer 71 which encircles the hub 63 and is secured thereto by a snap ring 72 received in a suitable groove formed in the hub 63. By this means the pulley 23 is caused to normally occupy the maximum diameter position, whereas the normal or initial position for the driving pulley 22 is the minimum diameter thereof.

It will be appreciated that the operating diameter of the driving pulley 22 can be increased only by forcing a corresponding decrease in the diameter of the driven pulley 23 since the shafts 20 and 21 are on fixed centers and since the belt 24 is of fixed length. Accordingly, the action of the speed-responsive means 25 tending to increase the diameter of the pulley 22 as the rotational speed of the shaft 20 increases is modified by the compression spring 69 which opposes a reduction in diameter of the pulley 23.

The action of the speed-responsive means 25 of the driving pulley 22 is further modified by a torque-responsive means incorporated in the driven pulley assembly 23. This torque-responsive means is illustrated in Figures 2, 3 and 7 and comprises a roller and cam mechanism indicated generally by the reference character 73 in Figure 3. The cam portion of this mechanism is defined by two pairs of lugs 74 and 75 disposed on opposite sides of the axis of rotation of the pulley and at equal distances from the center thereof. Conveniently the lugs 74 and 75 may comprise portions of a cylindrical body coaxial with the shaft 71. The lugs 74 and 75 are spaced to define a helical slot forming cam faces 76 and 77. Between the pairs of cam faces 76 and 77 there are positioned rollers 78 which are journalled for free rotation upon pins 79 secured in ears 80 and 81 formed on the radial web portion 70 of the pulley half 62 and extending across arcuate slots 82 within which the rollers 78 are received.

Since the cam surfaces 76 and 77 are carried by the fixed pulley half 61 and the rollers 78 are carried by the movable pulley half 62, relative angular displacement between these pulley halves will result in axial movement of the pulley half 62 relative to the pulley half 61 by reason of the angular disposition of the cam faces 76 and 77.

The cam and roller assembly 73 above described is responsive to the torque transmitted to the pulley 23 by the belt 24. This results from the fact that the power which is transmitted from the belt 24 to the pulley assembly 23 is divided equally between the pulley halves 61 and 62, being transmitted by the frictional engagement of the sides of the belt 24 with the pulley engaging faces 83 and 84 of the pulley halves 61 and 62, respectively. Since the pulley half 62 is journaled upon the hub 63 of the pulley half 61 for free rotation relative thereto (except as prevented by the engagement of the roller 78 with one or the other of the cam faces 76 and 77), the one-half of the torque which is transmitted from the belt 24 to the pulley half 62 must be transmitted to the driven shaft 21 through the cam and roller assembly 73. The helical nature of this cam and roller structure is such that torque transmitted in the manner described to the pulley half 61 produces an axial force tending to move the pulley half 62 axially relative to the pulley half 61.

In the form of the invention illustrated in Figures 1 through 7, the cam and roller mechanism 73 is so arranged as to tend to increase the diameter of the pulley 23 as the torque transmitted from the belt 24 to the pulley 23 increases. This axial force is added to the axial force exerted by the compression spring 69 and from these two forces opposes the tendency of the pulley 22 to increase its diameter as the rotational speed of the driving shaft 20 is increased. Also, under conditions of constant rotational speed of the driving pulley 22, the diameter thereof will vary to conform to variations in diameter of the driven pulley 23 resulting from changes in the torque applied to the driven shaft 21 and producing an axial movement of the pulley half 62 as a result of the action of the cam and roller assembly 73.

By properly proportioning the various parts hereinbefore described it is possible to obtain substantially any desired operating characteristic. For use as a transmission in motor scooters, an operating characteristic such as that illustrated in Figure 13 may be obtained.

Figure 13:
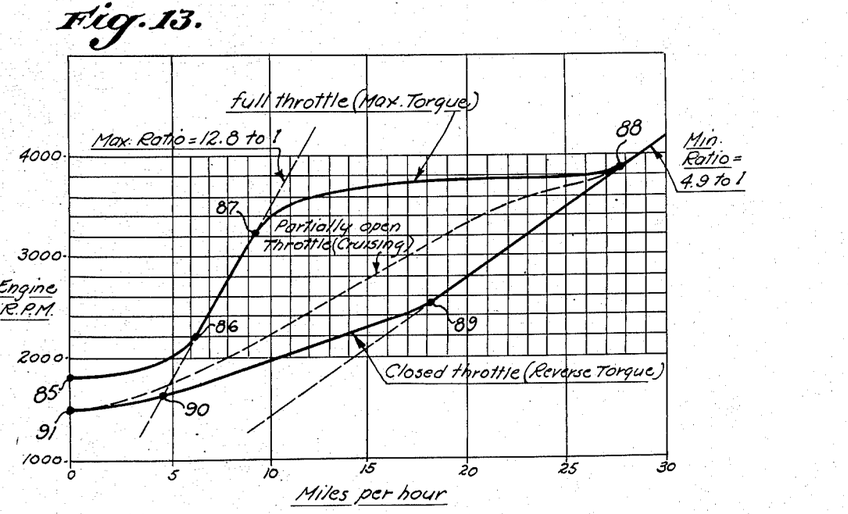
Figure 13 is a graph representing the operating characteristics of the power transmission apparatus of this invention under different and varying load conditions.

Figure 13 is a graph on which the rotational speed of the driving shaft is plotted as ordinates designated "Engine R. P. M.," and on which the rotational speed of the driven shaft is plotted as abcissae designated "Miles per Hour." Figure 13 thus shows the relation between the speed of the engine of a motor scooter and its road velocity under different conditions of operation. Figure 13, and the operation of the transmission apparatus, may best be described by first assuming the vehicle to be at a standstill, and the engine of the vehicle to be operating at an idling speed. Let it be assumed that the operator of the vehicle opens the throttle of the engine to its maximum position. Until the instant of so opening the throttle, the drive is disengaged by reason of the driving pulley 22 occupying its initial position as is illustrated in Figure 2. In response to the opening of the throttle, the engine accelerates and its speed increases while the vehicle remains stationary until the speed of the driving shaft is sufficient to start the balls 44 moving outwardly along their raceways 46. At this point, which is represented at 85 in Figure 13, the belt 24 begins to transmit power to the driven pulley 26, the driven pulley 26 at this time occupying its maximum diameter position as shown in Figure 2.

The vehicle begins to move over the ground at an accelerating speed, and as the engine speed continues to increase, the balls 44 exert an increasing force upon the movable pulley half 31 so as to continually reduce the slippage between the pulley 22 and the belt 24 until a point such as that represented at 86 in Figure 13 is reached wherein a full driving engagement is obtained between the pulley 22 and the belt 24 with the pulley 22 in its minimum diameter position. At this point in the operating characteristics a full drive is obtained between the engine and the driving wheels of the vehicle at the maximum transmission ratio setting of the transmission apparatus. This setting is indicated in Figure 13 by the dashed line bearing the legend "Maximum Ratio=12.8 to 1." The indicated ratio is the product of the transmission ratio of the transmission apparatus of this invention by the gear reduction interposed between the transmission apparatus and the driving wheels and comprising the jack shaft and chain or similar mechanism forming a part of the motor vehicle proper.

It will be recalled that by reason of the torque transmitted to the driven shaft 21, the cam and roller mechanism 73 and the compression spring 29 coact to attempt to hold the pulley 23 in its maximum diameter condition and will so hold the pulley until a sufficient force is exerted by the action of the balls 44 to overcome the combined action of the cam mechanism and the compression spring. Consequently the engine and the vehicle continue to accelerate with the transmission apparatus remaining in its maximum ratio condition. However, when the engine speed has reached a pre-determined value such as is represented by the point marked 87 in Figure 13, the centrifugal force on the balls 44 becomes sufficient to begin to move the pulley half 31 to the right and force a corresponding reduction in the diameter of the driven pulley 23 by overcoming the combined effects of the torque-responsive mechanism and the compression spring 69.

Since during acceleration of the vehicle, the torque opposing rotation of the driven shaft 21 remains nearly constant, and since the force exerted by the compression spring 69 increases only slightly with the change in position of the movable pulley half 62, it will be seen that a relatively small increase in engine speed will serve to shift the parts of the transmission mechanism from the maximum drive ratio position to the minimum drive ratio position which is illustrated in Figure 5. Such an increase in engine speed is represented by proceeding along the characteristic curve of Figure 13 from the point marked 87 to the point marked 88. It will be seen that during this region the engine speed increases only slightly and is substantially constant over the major portion of the range, whereas the speed of the vehicle increases from approximately 9 M. P. H. to about 28 M. P. H. At engine speeds above that represented by the point 88 in Figure 13, the transmission apparatus remains in its minimum drive ratio condition and the engine speed varies directly as a function of the vehicle speed at the fixed minimum drive ratio which is represented by the dashed line in Figure 13 bearing the legend "Minimum Ratio=4.9 to 1." Here again, the indicated ratio is the product of the drive ratio of the transmission apparatus by the gear ratio of the drive mechanisms connecting the transmission apparatus to the driving wheels and forming a part of the motor vehicle with which the transmission apparatus is used.

If after attaining a vehicle speed of approximately 30 M. P. H., the operator suddenly closes the throttle of the engine and allows the vehicle to decelerate to a standstill using the engine as a brake, the operating characteristic is that represented by the lower heavy line in Figure 13. The difference between the two characteristics results from the fact that the torque responsive mechanism 73 is also sense responsive. During the closed throttle condition while the vehicle is decelerating, power is actually transmitted in a reverse direction through the transmission apparatus of this invention. This torque being transmitted through the torque responsive mechanism 73 produces an axial force on the pulley half 62 in a direction opposite to that hereinbefore described. This force is in opposition to the force exerted by the spring 69 and tends to move the pulley half 62 to a position corresponding to a smaller operating diameter of the driven pulley 23. Under the reversed torque condition as described, the torque responsive mechanism 73 thus is in a direction to aid the forces exerted by the balls 44 of the driving pulley assembly, and so operates to maintain the transmission apparatus in its minimum drive ratio condition until the vehicle and engine speed reduce to a value such as that represented by the point marked 89 in Figure 13. At this point, the centrifugal force exerted on the balls 44 begins to fall below a value sufficient to maintain the pulley 22 in its maximum diameter condition, it being realized that the force exerted by the torque responsive mechanism 73 is alone insufficient to overcome the force of the spring 69.

At the point 89 and lower speeds, the spring 69 begins to move the pulley half 62 to the left so as to increase the diameter of the driven pulley 23. This is accompanied by a corresponding decrease in the diameter of the driving pulley 22 so that the drive ratio is steadily increased until the maximum drive ratio condition obtains, as is represented in Figure 13 by the point marked 90. At still lower vehicle and engine speeds, the driving pulley 22 approaches the initial and disengaged position represented in Figure 2, so that from the point 90 to the point marked 91 in Figure 13, the belt 24 begins to slip relative to the pulley 22. At the point 21, the vehicle has come to a standstill and the engine decelerates to an idling speed somewhere below that represented by the point marked 91.

It will be apparent that with a partially open throttle the characteristic curve will lie between the two extremes hereinbefore described, as for example, as is represented by the dashed curve on Figure 13 bearing the legend "Partially Open Throttle-Cruising."

Let it be assumed that the operator of the vehicle starts from a standstill with a fully opened throttle as was described with reference to the characteristic curve 85—88, but having achieved a vehicle speed of 15 M. P. H., the operator partially closes the engine throttle intending to continue at a constant speed. Unlike the operation of conventional transmissions, the engine speed does not remain constant at its then value, but instead drops immediately to a much lower speed by reason of the action of the transmission apparatus of this invention. This result obtains because a greatly reduced torque is required to maintain the speed of the vehicle constant at 15 M. P. H. than has been applied up to that point in accelerating the vehicle. This resulting reduction in torque is detected by the torque responsive mechanism 73 and results in a reduction in the axial force tending to aid the spring 69 in its efforts to maintain the pulley 62 in a maximum diameter condition. This reduction in force on the pulley half 62 allows the balls 44 to move further outwardly at the engine speed then obtaining so as to reduce the drive ratio of the transmission apparatus. Since the vehicle speed is assumed to remain constant, this must be accomplished by a reduction in the speed of the engine. The reduction in engine speed of course reduces the force developed by the speed responsive mechanism tending to force the pulley 22 to its maximum diameter condition, with the result that the apparatus stabilizes at a new value corresponding to the new torque condition imposed upon the driven shaft 21. This operating position will lie somewhere between the maximum and minimum curves shown on Figure 13, as for example, along the intermediate dashed line curve.

Figures 8, 9, 10:
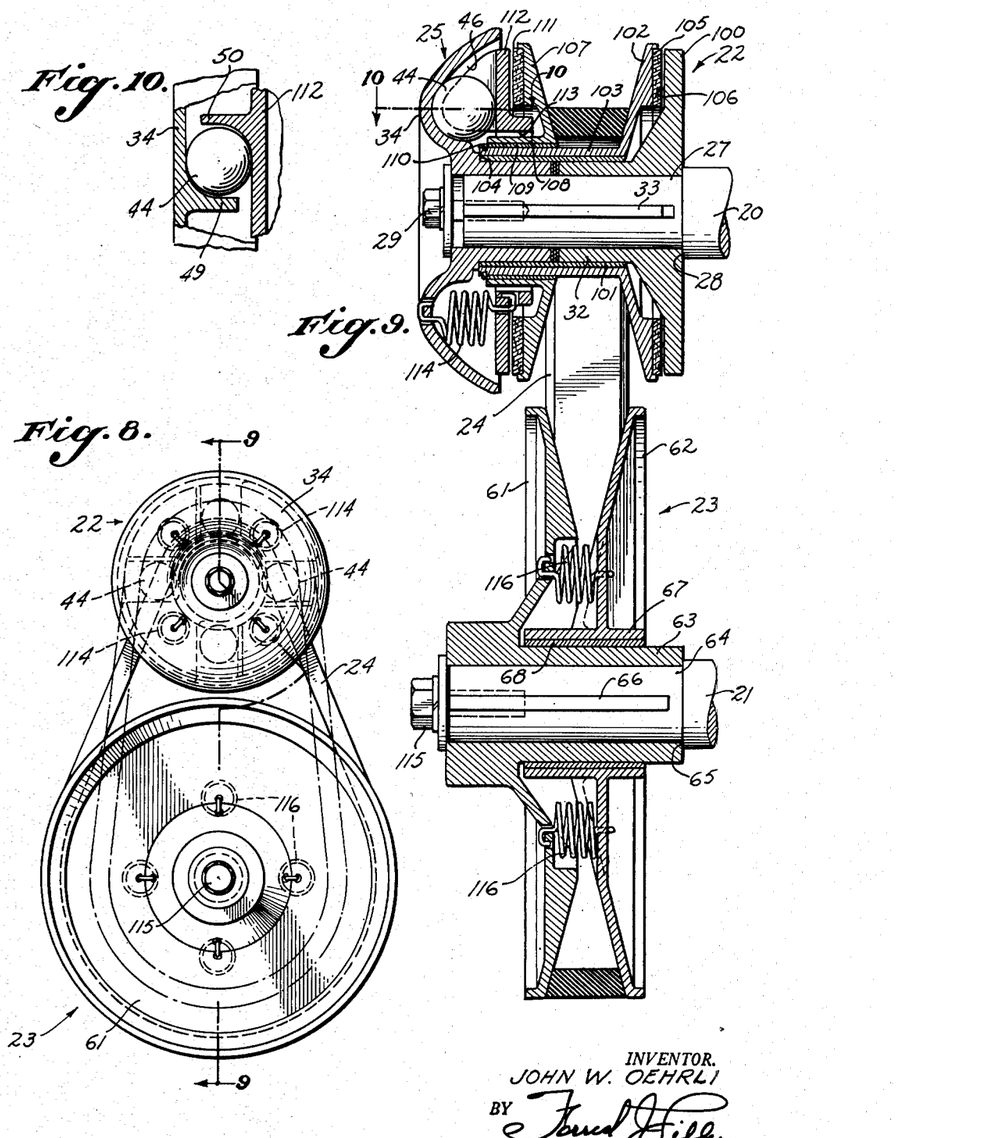
Figure 8 is an elevational view similar to Figure 1, but illustrating a modified form the invention may take.
Figure 9 is a vertical sectional view taken substantially along the line 9—9 of Figure 8 illustrating the details of construction of the driving and driven members employed in the modified form of the invention.
Figure 10 is a fragmentary sectional view taken substantially along the line 10—10 of Figure 9 and illustrating the driving connection afforded by the speed responsive elements incorporated in the driving member.

An alternative embodiment of the invention is illustrated in Figures 8 through 10. In these figures like reference characters are used to identify the same parts as are employed in the previously described modification. Referring to Figure 9, the driving pulley assembly 22 thereof is similar in many respects to that described with reference to the first embodiment of the invention, and includes a speed responsive mechanism 25 for controlling the operation of the variable diameter pulley. In Figure 9, however, the driving pulley 22 is shown as including a built-in clutch mechanism, and to this end includes a driven clutch member 100 which is secured to the shaft extension 27 by means of the aforementioned key 33 which is used also to secure the housing 34 to the shaft extension 27. The driven member 100 and the housing 34 are clamped against the shaft shoulder 28 by the clamping screw 29. The driven member 100 includes the hub 32, and this hub is surrounded by a bearing sleeve 101. Upon the bearing sleeve 101 there is mounted an axially fixed or stationary pulley half 102. The pulley half 102 includes a sleeve portion 103 which encircles and is coextensive with the bushing 101, the bushing and sleeve normally bearing against a radial shoulder 104 provided on the inner surface of the housing member 34.

The outer face of the pulley half 102 carries friction material 105 adapted, upon a slight movement of the pulley half 102 to the right as viewed in Figure 9, to be brought into engagement with a radial face 106 of the driven member 100. The pulley 102 with its facing 105 thus constitutes with the driven member 100 a clutch for drivably engaging the pulley half 102 with the driving shaft 20 upon pressure engagement of the facing material 105 with the pressure face 106.

The pulley also includes a second pulley half 107 which includes a hub 108 mounted upon the sleeve 103 for sliding movement relative thereto as by an interposed bushing 109. Movement of the pulley half 107 to the left is limited by means of a snap ring 110 received within a suitable groove encircling the outer end of the sleeve portion 103. The outer face of the pulley half 107 carries a clutch facing 111 similar to the facing 105 hereinbefore mentioned, and adapted to be engaged by a pressure plate 112. Pressure plate 112 comprises a disk-like member having a central aperture 113 for loosely receiving the hub 108 so as to permit free relative rotation between the pressure plate member 112 and the pulley half 107. The pressure plate member 112 is similar to the pressure plate member 43 mentioned in connection with the previously described embodiment of the invention, and includes the upturned ears 50 for confining the balls 44 in their raceways 46 and for receiving torque transmitted through the balls 44 by the ribs 49 formed on the housing 34. A plurality of tension springs 114 extended between the housing 34 and the pressure plate 112 serves to normally hold the pressure plate away from the clutch facing material 111.

As the driving shaft 20 is rotated at a slow or idling speed, the driven member 100, the housing 34 and the pressure plate member 112 are slowly rotated therewith. The pulley comprising pulley halves 102 and 107 remains stationary by reason of being freely rotatably mounted upon the bearing member 101. As the speed of rotation of the driving shaft is increased, the balls 44 tend to move outwardly along their raceways 46 and so move the pressure plate 112 into engagement with the clutch facing 111. This force is also transmitted from the pulley half 107 through the belt 24 to move the pulley half 102 slightly to the right and engage the clutch facing 105 with the driving member 100. As the pressure exerted by the balls is increased, the clutch thus formed is gradually engaged so as to start the rotation of the pulley formed by the halves 102 and 107. As the balls 44 move further outwardly along their raceways, the pulley half 107 is gradually moved to the right relative to the pulley half 102 by reason of the axially slidable mounting furnished by the bearing member 109 to increase the effective diameter of the pulley.

The driving member shown in Figure 9 thus operates as a variable diameter driving pulley in precisely the same manner as was described with reference to the form of the invention shown in Figure 2, the principal difference residing in the clutching mechanism for engaging the driving shaft 20 with the pulley.

The driven pulley 23 employs the two pulley halves 61 and 62, the former of which includes the central hub 63 keyed by the key 66 to the shaft extension 64. A clamping screw 115 may be employed for clamping the hub 63 against the shoulder 65. The pulley half 62 includes also the central hub 67 which is mounted by the sleeve bearing 68 for angular and axial movement relative to the hub 63.

In the form of the invention shown in Figure 9, the driven pulley 23 is of a modified form, the compression spring 69 and the cam and roller mechanism 73 being omitted and instead thereof employing a plurality of tension springs 116 extending axially between the pulley halves 61 and 62. The tension springs 116 are relatively short and are characterized by a relatively high spring constant. The pulley half 62 is thus spring-urged to its lefthand position by the springs 116, these springs performing in this respect the function performed by the compression springs 69 in the previously described modification of the invention.

The pulley half 62 is subject to angular displacement relative to the pulley half 61 by reason of being mounted for such angular movement upon the hub 63 and since one-half of the torque transmitted by the belt 24 is transmitted to this pulley half. The torque is transmitted from the pulley half 62 to the pulley half 61 through the springs 116 which are elongated by any angular displacement of the pulley halves relative to each other. This elongation of the springs 116 increases the axial component of force exerted by those springs so that as the torque transmitted by the belt is increased the pulley half 62 is urged toward the pulley half 61 by a correspondingly increased force. In this respect the springs 116 perform the same function as is performed by the cam and roller mechanism 73 described in connection with the first mentioned embodiment of the invention. It is to be noted, however, that angular displacement of pulley half 62 in either direction from the normal or neutral position produces a force tending to move the pulley half 62 toward the pulley half 61 so that the form of the invention shown in Figure 9 responds in the same way to torque in either direction instead of distinguishing between forward and reverse torques as does the form of the invention shown in Figure 2.

Figures 11, 12:
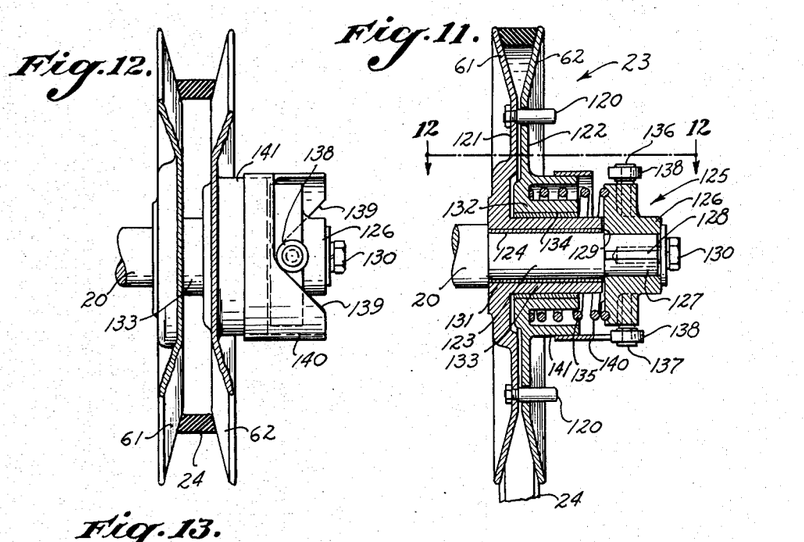
Figure 11 is a vertical sectional view through a driven member of alternative construction.
Figure 12 is an elevational view with parts broken away and shown in section and taken substantially along the line 12—12 of Figure 11.

Figures 11 and 12 illustrate still another form the torque-responsive driven member may take. In this form of the invention, the two pulley halves 61 and 62 are drivably inter-engaged as by means of a plurality of pins 120 secured to a radial web portion 121 of the pulley half 61 and passing through suitable apertures formed in a corresponding radial web portion 122 of pulley half 62. This structure serves to drivably inter-engage the pulley halves 61 and 62 while permitting axial movement of the two halves toward and away from each other.

The driven shaft 20 includes a reduced diameter portion 123 upon which the two pulley halves 61 and 62 are mounted for free rotation as a unit by an interposed sleeve bearing member 124. Torque is transmitted from the pulley assembly to the driven shaft 20 by means of a torque-responsive mechanism indicated generally by the reference character 125 and serving to connect the pulley assembly to the shaft. This mechanism includes a plate-like driven member 126 which is non-rotatably secured upon a shaft extension portion 127 of still further reduced diameter and keyed thereto as by means of a key 128. The driven member 126 may be clamped against a shoulder 129 defined by the shaft portions 123 and 127 by means of a clamping screw 130 threadedly engaging the outer end of the shaft extension 127. The driven member 126 cooperates with a radial shoulder 131 defined by the driven shaft 20 and the reduced diameter portion 123 thereof to hold the two pulley halves 61 and 62 against axial movement relative to the shaft 20.

The pulley half 62 is mounted for axial sliding movement relative to the pulley half 61 by means of a central hub 132 which encircles a hub 133 of the pulley half 61, the hub 132 being slidably movable relative to the hub 133 upon a bearing sleeve 134 interposed between the two hubs. A compression spring 135 encircles the hub 132 and is confined between the radial web portion 122 of the pulley half 62 and the inner face of the driven member 126 and serves to normally urge the pulley half 62 to the left as viewed in Figure 11 so as to provide the maximum effective pulley diameter.

The driven member 126 is provided with diametrically opposed stub shafts 136 and 137 upon which are rotatably mounted roller members 138. The rollers 138 engage cam surfaces 139 defined by a cylindrical cam member 140 surrounding a cylindrical portion 141 of the pulley half 62 and secured thereto by any suitable means such as pins or welding.

The torque which is applied to pulley 61, 62 by the belt 24 is transmitted to the shaft 20 through the engagement of the cam surfaces 139 with the rollers 138. This force, because of the inclination of the cam surfaces 139, produces a component tending to move the cam surfaces 139 to the left relative to the driven member 126. Since the cam surfaces 139 are formed upon the member 140 which is in turn immovably secured to the pulley half 62, it will be seen that the transmission of torque through the cam and roller assembly will produce a force tending to move the pulley half 62 toward the pulley half 61 in a manner analogous to that described in connection with the first mentioned embodiment of this invention.

As illustrated in Figures 11 and 12, the cam and roller arrangement is so arranged as to be responsive only to forwardly directed torques. A reversal of the inclination of the cam surfaces 139 will make the device responsive only to torques in the reverse direction. If desired, the cam surfaces 139 may be V-shaped so as to provide a pair of surfaces of opposite inclination, so that the device will be responsive to torques in both directions.

Attention is directed to the fact that all forms of the invention described herein provide a power transmission apparatus of continuously variable ratio depending upon the effective diameters of the driving and driven pulleys. The ratio in each case is automatically determined and adjusted by means of the speed responsive mechanism associated with the driving pulley coacting with the torque responsive mechanism associated with the driven pulley. The device operates to provide that drive ratio which, in relation to the speed of the driving shaft and the resisting torque on the driven shaft, is best suited to obtaining the maximum power or maximum efficiency from the engine connected to the driving shaft.

Attention is directed to the fact that both forms of the driving member herein described include an automatic clutching device for completely disengaging the drive at low rotational speeds of the driving shaft so as to permit the engine of the motor vehicle to idle without transmitting any power or torque to the driving wheels of the vehicle. Engagement of the clutch upon acceleration of the engine is automatic and is smooth and gradual so as to minimize the shocks attendant upon an abrupt engagement of a clutch. It should also be observed that the centrifugally responsive elements which have been shown in the form of the balls 44 serve not only to provide for engaging the clutch and varying the diameter of the driving pulley as a function of the speed of rotation of the driving shaft, but serve also as torque transmitting elements for transmitting from the driving shaft to one of the pulley halves the share of the torque which must be carried by that pulley half.

It will be appreciated that either of the two forms of driving members shown in Figures 2 and 9 may be used with any of the forms of driven members shown in Figures 2, 9 and 11, the particular pair chosen depending upon the operating characteristic desired. Also any of the variable diameter pulleys shown herein may be used with a conventional pulley of fixed diameter by using a belt idler or by mounting the driving and driven shafts for compensating movement toward and away from each other. The invention is accordingly not limited to the specific associations of driving and driven members shown herein, which are by way of example only, but embraces as well alternative associations such as those just mentioned.

While the various preferred embodiments of this invention has been illustrated and described herein, the invention is not to be limited to the forms shown and described except as defined in the appended claims.

I claim:

1. In a power transmission apparatus including a rotating shaft, a variable diameter V-belt pulley having oppositely inclined belt engaging surfaces comprising: a first pulley half defining one of said surfaces and fixed on said shaft; a movable pulley half defining the other of said surfaces; means mounting said movable pulley half on said shaft for axial sliding movement relative thereto to vary the axial spacing of said surfaces; a housing secured to said shaft for rotation therewith defining a plurality of raceways extending angularly outward from said shaft and toward said movable pulley half; and a ball in each of said raceways engaging said housing and said movable pulley half, whereby rotation of said shaft at increasing speeds centrifugally urges said balls outwardly along said raceways to apply increasingly larger forces on said movable pulley half in a direction tending to move said movable half toward said first pulley half, said raceways including lateral walls for engagement by said balls to prevent circumferential movement of said balls relative to said housing and relative to said movable pulley half, whereby said balls also serve to drivably interconnect said housing and said movable pulley half.

2. In a power transmission apparatus of the character described, a speed-responsive variable pulley to operatively interconnect a shaft and a belt, said pulley comprising: a first pulley half fixed relative to said shaft for rotation therewith; a second pulley half cooperative with said first pulley half for engagement with said belt, said second pulley half being movable axially relative to the first pulley half to vary the effective diameter of the two pulley halves with respect to engagement with said belt; centrifugal means movable outward to shift said second pulley half axially to increase said effective diameter; a first wall means connected with said shaft on one side of said centrifugal means with respect to the direction of rotation of the centrifugal means to transmit rotation of the shaft in one rotary direction to said centrifugal means; and a second wall means connected with said second pulley half on the other side of the centrifugal means with respect to direction of rotation of the centrifugal means to transmit rotation in said rotary direction from the centrifugal means to said second pulley half thereby operatively connecting said shaft with said second pulley half.

3. A variable speed pulley as set forth in claim 2 in which said two wall means form a race confining said centrifugal means.

4. A variable pulley as set forth in claim 3 in which said centrifugal means comprises ball means.

5. A variable pulley as set forth in claim 2 which includes a third wall means connected with said shaft on the other side of said centrifugal means with respect to direction of rotation of the centrifugal means to transmit rotation of the shaft in the other rotary direction to said centrifugal means and a fourth wall means connected with said second pulley half on the one side of the centrifugal means with respect to direction of rotation of the centrifugal means to transmit rotation in said other rotary direction from the centrifugal means to said second pulley half.

6. A variable pulley as set forth in claim 5 in which said centrifugal means comprises at least two centrifugal weights, one of said weights being confined between said first and second wall means and the other weight being confined between said third and fourth wall means.

7. A variable pulley as set forth in claim 6 in which said centrifugal weights are ball members.

8. In a power transmission apparatus of the character described, a speed-responsive variable pulley to operatively interconnect a shaft and a belt, said pulley comprising: a first pulley half fixed relative to said shaft for rotation therewith; a second pulley half cooperative with said first pulley half for engagement with said belt, said second pulley half being movable axially relative to the first pulley half to vary the effective diameter of the two pulley halves with respect to engagement with said belt; a housing fixed relative to said shaft adjacent said second pulley half to form therewith an annular space with walls converging towards the periphery of the space; centrifugal means in said annular space for wedging action against said converging walls to shift said second pulley half axially to increase said effective diameter; a first wall means extending into said space from said housing on one side of said centrifugal means with respect to direction of rotation of the centrifugal means to transmit rotation of the housing in one rotary direction to said centrifugal means; and a second wall extending to said space from said second pulley half on the other side of said centrifugal means with respect to direction of rotation of the centrifugal means to transmit rotation in said rotary direction from the centrifugal means to said second pulley half thereby operatively connecting said shaft with said second pulley half.

9. A variable pulley as set forth in claim 8 in which said centrifugal means comprises ball means and said two wall means form a race confining the ball means.

10. A variable pulley as set forth in claim 8 which includes a third wall means extending into said space from said housing on the other side of said centrifugal means with respect to direction of rotation of the centrifugal means to transmit rotation of the housing in the other rotary direction to said centrifugal means; and a fourth wall means extending into said space from said second pulley half on said one side of the centrifugal means with respect to direction of rotation of the centrifugal means to transmit rotation in the other rotary direction from the centrifugal means to said second pulley half.

11. A variable pulley as set forth in claim 10 in which said centrifugal means comprises at least two centrifugal weights, one of said weights being confined between said first and second wall means, the other weight being confined between said third and fourth wall means.

12. A variable pulley as set forth in claim 11 in which said two centrifugal weights are ball members.

References Cited in the file of this patent

UNITED STATES PATENTS

| Number | Name | Date |
|---|---|---|
| 1,618,644 | Dickson | Feb. 22, 1927 |
| 1,777,354 | Dina | Oct. 7, 1930 |
| 1,915,107 | Sweigart | June 20, 1933 |
| 2,101,084 | Meyers | Dec. 7, 1937 |
| 2,135,348 | McElroy | Nov. 1, 1938 |
| 2,144,443 | Thomas | Jan. 17, 1939 |
| 2,150,456 | Perrine | Mar. 14, 1939 |
| 2,151,987 | Perrine | Mar. 28, 1939 |
| 2,155,351 | Paulus | Aug. 18, 1939 |
| 2,168,744 | Perrine | Aug. 8, 1939 |
| 2,256,699 | Almen | Sept. 23, 1941 |
| 2,283,267 | Kohl | May 19, 1942 |
| 2,310,081 | Hill | Feb. 2, 1943 |
| 2,496,061 | Miner | Jan. 31, 1950 |
| 2,512,816 | Sweger | June 27, 1950 |